Figure 6:
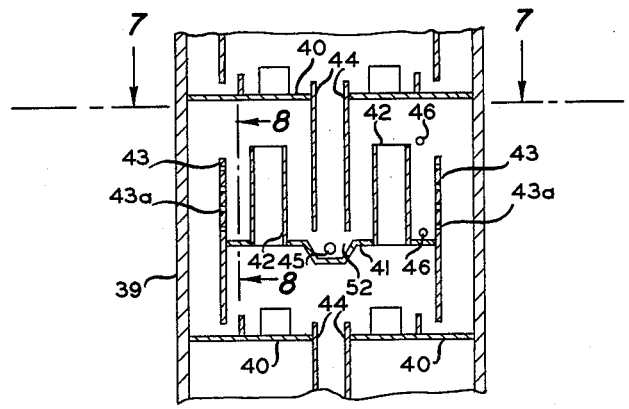

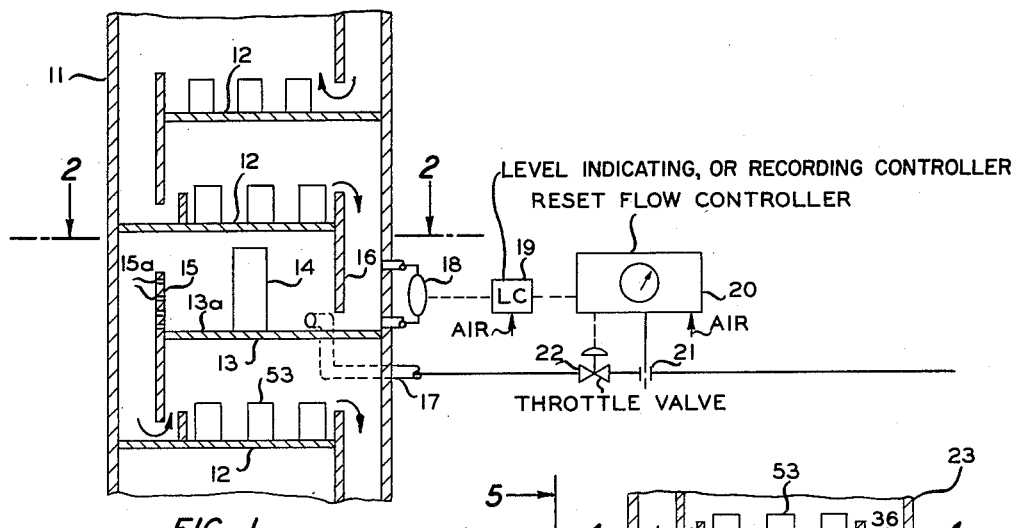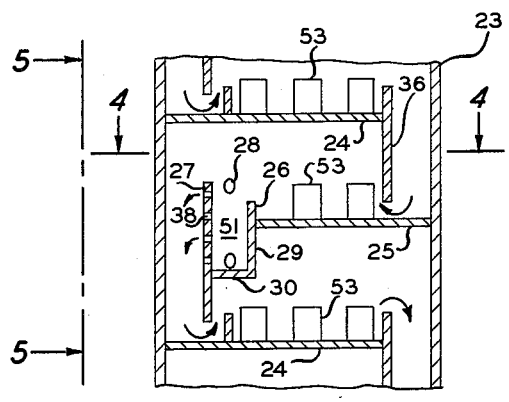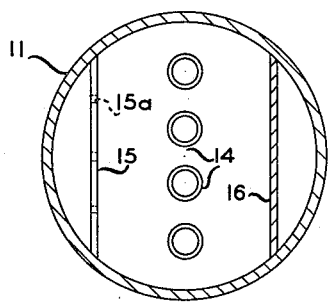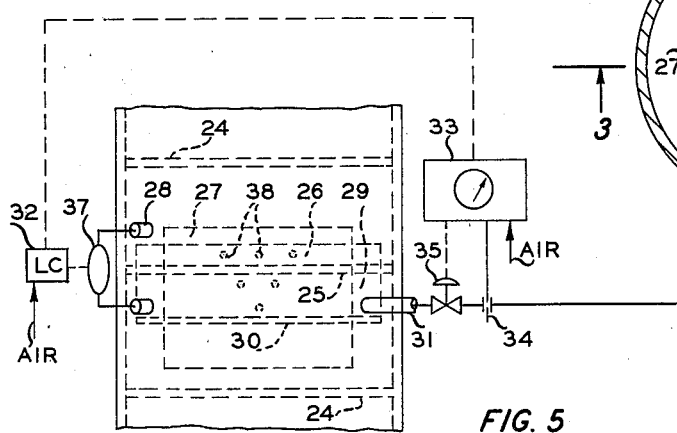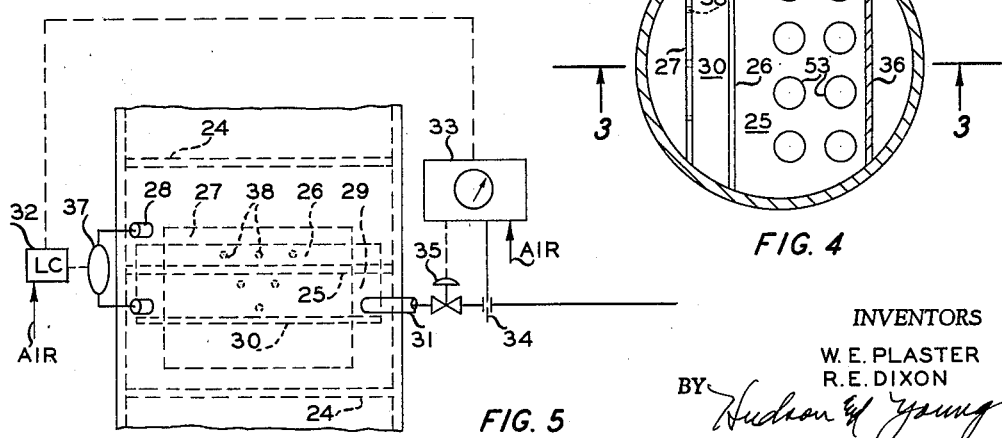

INVENTORS
W. E. PLASTER
R. E. DIXON
BY
ATTORNEYS

United States Patent Office 3,053,521
Patented Sept. 11, 1962

3,053,521
FRACTIONAL DISTILLATION APPARATUS
William E. Plaster and Rolland E. Dixon, Bartlesville, Okla., assignors to Phillips Petroleum Company, a corporation of Delaware
Filed Oct. 1, 1959, Ser. No. 843,784
12 Claims. (Cl. 261—114)

This invention relates to fractional distillation. In one aspect it relates to a fractional distillation column with provision for removal of a side stream. In another aspect it relates to a weir assembly for a side draw tray for use in a fractional distillation column.

In the control of a fractional distillation column, particularly when a majority of the internal reflux is withdrawn as product from a side draw tray of the column, it is important to make certain that at least some liquid flows downward to the next tray in order that that portion of the column will not run dry. According to our invention, we have devised a side draw tray for a fractional distillation column in which provision is made that there will always be at least some liquid flowing downward from the take-off tray to the next lower tray. Our tray is not ordinarily provided with vapor-liquid contact promoting apparatus because it is mainly a take-off tray, not a contacting tray. This tray is provided with a weir in which openings are made through which liquid as reflux flows to the next lower tray. It is intended that all of the liquid reflux flowing downward from this tray pass through openings so that its volume can be determined. Preferably, it is intended that downflowing liquid shall not pass over the top of the weir as in normal fractional distillation trays. One system is to drill holes or openings of a predetermined size or configuration through which liquid can flow to the next lower tray. It is intended that the combined area of the holes or openings is such that all of the liquid at normal flow, or at a flow slightly greater than normal, will pass through the holes rather than over the top of the weir. In this manner the rate of flow of the downflowing liquid can be quite accurately determined. At least one of the above-mentioned openings is positioned near the bottom of the weir plate so that as long as there is liquid on the take-off tray some of it will flow downward as reflux to prevent the column going dry at this point. At higher elevations on the weir plate the number of openings, or rather the opening area, is greater than near the bottom of the plate. Other configuration than holes or openings can be used as, for example, a V-shaped notch, with the apex of the V pointing downward and positioned substantially at the deck of the tray. A weir with holes or openings as mentioned above is preferred because such a weir possesses greater strength and requires less bracing to prevent buckling. Other shapes of openings can be used in making the weir plate, but the two types of openings mentioned are preferred because they are more easily made.

A liquid level indicator can be used in conjunction with the tray to indicate the level of liquid thereon. Circular weir openings and V-shaped weir openings are furthermore preferred because orifice formulas are available for calculating the flow through such weirs for various heights of liquid above the bottom of the weir. By using a level indicator and a proper orifice formula, the flow of liquid through the weir is easily determined and this flow of liquid, of course, is the internal reflux of the column flowing downward from the take-off tray of this invention.

Furthermore, we also provide a liquid level controller and a reset flow controller for control of a motor valve in the take-off line from our side draw tray. This apparatus is provided so that the flow controller with a pneumatically operable set point controls the rate of liquid withdrawal from the tray and the liquid level controller resets the set point of the flow controller in such a manner that at higher liquid levels on the tray the rate of withdrawal of the side stream is increased.

An object of this invention is to provide a side draw tray for use in a fractional distillation column for withdrawal of a side stream product and at the same time make provision for passage of reflux to a next lower and vapor-liquid contacting tray. Another object of this invention is to provide such a side draw tray on which the level of the liquid is easily determined. Still another object of this invention is to provide such a tray and apparatus therefor for determining the rate of passage of reflux to a next lower tray. Still other objects and advantages of this invention will be realized upon reading the following description which, taken with the attached drawing, forms a part of this specification.

Figure 7:
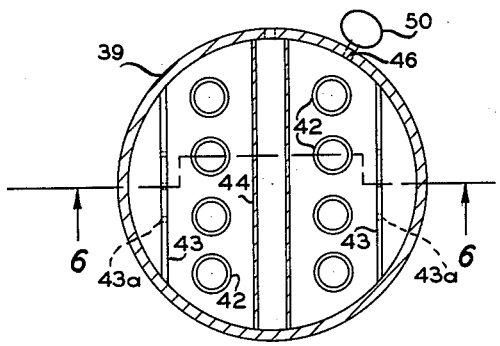
Figure 8:
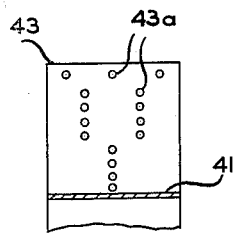
Figure 9:
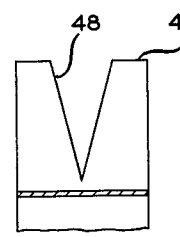

In the drawing,
FIGURE 1 is an elevational view, partly in section, of one embodiment of side draw tray of this invention.
FIGURE 2 is a sectional view taken on the line 2—2 of FIGURE 1.
FIGURE 3 is an elevational view, partly in section, of another embodiment of our invention.
FIGURE 4 is a sectional view taken on the line 4—4 of FIGURE 3.
FIGURE 5 is a view taken from the line 5—5 of FIGURE 3.
FIGURE 6 is an elevational view, partly in section, of another embodiment of our invention and taken on the line 6—6 of FIGURE 7.
FIGURE 7 is a sectional view taken on the line 7—7 of FIGURE 6.
FIGURE 8 is an elevational view taken on the line 8—8 of FIGURE 6.
FIGURE 9 is an elevational view of an alternate embodiment of the apparatus of FIGURE 8.

In the drawing reference numeral 11 identifies a fractional distillation column provided with conventional bubble cap trays 12 for promoting vapor-liquid contacting. A side stream product take-off tray 13 comprises a deck 13a containing one or more chimneys 14 and a perforate baffle plate or weir 15. This perforate weir 15 is provided with perforations 15a. A plate 16 is provided to define a downcomer space between that plate and the walls of the column 11 for downward passage of liquid from the tray above to the take-off tray. The lower end of baffle 16 is near the deck 13a so as to provide a vapor trap. The lower end of the perforate baffle or weir 15 also extends downward to a point near the next lower tray for providing a vapor seal. The portion of the baffle plate 15 below deck 13a is not perforated. A pipe 17 leads from the level of the top surface or deck 13a for withdrawal of the liquid side stream product. Pipe 17 is provided with a throttle valve 22 and an orifice plate assembly 21. This valve and orifice plate assembly communicate with a pneumatically operable reset flow controller 20 for controlling the rate of flow through pipe 17. A liquid level controller 19 is provided in conjunction with the liquid level sensing means 18 for indicating the level of the liquid on the take-off tray 13. These instruments are so installed and regulated that upon increase of liquid level on tray 13a, the liquid level controller 19 resets the set point of flow controller 20 to increase the opening of the throttle valve 22. In other words, as the level of the liquid on tray 13a rises, the rate of withdrawal of side product is increased; and conversely, when the level of liquid on the take-off tray 13a drops, throttle valve 22 is throttled to reduce the rate of product removal.

The controller 19 can, if desired, be a recorder-controller. By using a liquid level recorder-controller, a permanent record of the level of the liquid on tray 13a is obtained and this level controller resets the set point of flow controller 20 to regulate the rate of liquid removal. Since the area of the weir opening or openings 15a in the perforate weir 15 is greater at higher levels of the weir, as the liquid level on tray 13a rises the flow of reflux to the next lower tray increases. Conversely, at low liquid levels on tray 13a, the flow of liquid through perforations 15a is smaller. FIGURE 8 illustrates an arrangement of circular openings through a baffle plate, similar to plate 15, suitable for use according to this invention. The liquid level recorder-controller can be calibrated to record the flow of liquid through the perforations 15a in response to the level of the liquid on the tray. Such calibration makes use of an equation such as $$Q = cA\sqrt{2gh}$$

for each opening in the plate, and in which Q equals gallons of flow per minute, c is the orifice coefficient, A is the area of the opening in square feet, h is the feet of head of liquid above the center of the orifice, and g equals 32.2 ft./sec.$^2$ In FIGURE 3 is illustrated an alternate embodiment of our invention in which a fractionating column 23 is provided with conventional bubble cap trays 24 provided with bubble caps 53. In this embodiment a side draw product take-off tray 25 is a combination side product take-off tray and vapor liquid contacting tray. In this case vapor flows upward through the take-off tray by way of bubble caps 53. A low weir 26 is provided for maintaining at least a minimum liquid level on the tray 25 for vapor-liquid contacting. A well 51, defined by a side plate 29, a floor plate 30, another side plate 27 and the walls of column 23 is provided for maintenance of a quiescent volume of liquid. This quiescent volume of liquid is necessary for proper operation of a liquid level indicating float. The baffle 27 is the perforate baffle according to this invention, the perforations being identified by reference numeral 38. A pair of openings 28 is provided for communication with a float chamber 37, illustrated in FIGURE 5. The float within float chamber 37 is connected with a liquid level recorder-controller 32 which, in turn, is connected with a reset flow controller 33 for resetting the set point thereof for regulation of a throttle valve 35 to control the rate of liquid withdrawal from the well 51. Throttle valve 35 is positioned in pipe 31 along with orifice plate assembly 34. This control apparatus of FIGURE 5 operates in a manner similar to the operation of the apparatus of FIGURE 1. FIGURE 3 illustrates the position of the float chamber 37 (openings 28) relative to the well 51. Plate 36 is the downcomer plate from the bubble cap tray above and maintains a vapor seal on the take-off tray 25.

The apparatus of FIGURE 6 is intended as large diameter equipment in which a fractionating column 39 is a dual-flow column in that there are two parallel streams of reflux flowing downward in the column countercurrent with respective upflowing vapors. Such columns are common in the petroleum refining art. In this figure, take-off tray 41 is provided with a well 52 common to both sides of the column. At one end of well 52 is an opening 45 to which is connected the liquid take-off withdrawal pipe, not shown. Plates 44 extend downward from the immediately above bubble cap tray to provide vapor seals. Chimneys 42 permit passage of vapor through the take-off tray 41. Perforate weirs 43 contain openings 43a through which liquid flows downward to the next lower bubble cap tray. Openings 46 in the wall of column 39 are for attachment of a liquid level indicating float chamber 50, illustrated in FIGURE 7. FIGURE 8 is a side view of perforate weirs 43 illustrating the positioning of the openings 47. In this figure it is noted that the openings at levels near the surface of the take-off tray 41 are single openings. If desired, these openings may be made progressively smaller at elevations near the tray 41. At levels somewhat above the tray there are illustrated pairs of openings while at a still higher elevation are illustrated three openings at the same level. In the combined area of these several openings in such a perforate weir as weir plate 43, it is intended that all of the downflow reflux to the next lower vapor-liquid contacting tray at normal or slightly greater than normal flow rates flows through these openings 47 with none flowing over the top of the weir plate. By applying formulas such as that mentioned hereinabove, and using openings such as openings 47, the reflux flow can be determined and recorded quite accurately.

In FIGURE 9 is illustrated an alternate type of weir plate. This plate 49 is provided with a V-shaped weir 48 with the apex of the V pointing downward and at an elevation near the top surface of the take-off plate. A suitable formula for liquid flow through such a weir opening is used for calibration of a liquid level recorder-controller so that at various heights of level of liquid above the apex of the V the rate of reflux flow is easily determined.

An example of the operation of a take-off tray assembly of this invention is illustrated in the following tabulation. These data are in terms of barrels per stream day to and from a depropanizer column producing a propane-rich overhead product, an isobutane-rich side stream and a bottoms product comprising mainly pentanes and higher boiling hydrocarbons along with an appreciable proportion of normal butane. Such a column is used in a hydrofluoric acid alkylation system. The 5,767 barrels per stream day of isobutane reflux is that reflux flowing through a perforate orifice plate according to this invention to a next lower bubble cap tray. This 5,767 barrels per stream day is equivalent to 210 gallons per minute at tray conditions. This column treats 20,664 barrels of feed per day with the production of the several products as indicated in the tabulation.

|  | Feed | Bottoms | Sidedraw | Net Overhead | Isobutane Reflux |
|---|---|---|---|---|---|
| HF | 100 |  | 20 | 80 |  |
| Ethane |  |  |  |  | 7 |
| Propylene |  |  |  |  |  |
| Propane | 1,981 |  | 1,172 | 809 | 420 |
| Isobutane | 12,390 | 47 | 12,330 | 13 | 4,416 |
| Butylenes |  |  |  |  |  |
| n-Butane | 3,371 | 896 | 2,475 |  | 886 |
| Pentanes+ | 2,805 | 2,701 | 104 |  | 38 |
| Total | 20,647 | 3,644 | 16,101 | 902 | $^1$5,767 |

$^1$ 5,767 bbls. per stream day equals 210 gallons per minute at tray conditions.

It will be noted that by positioning at least a portion of the weir opening at a level near the upper surface of the take-off tray, there is always liquid reflux flowing to a next lower vapor-liquid contacting tray. Thus, by so positioning the weirs of this invention, none of the contacting trays below the take-off tray ever go dry. It is realized by those skilled in the art that when a vapor-liquid contacting tray in a fractional distillation column goes dry there is a serious column upset and frequently considerable periods of time are required to right the wrong done by such a column upset.

Materials of construction may be selected from those commercially available, taking into consideration the corrosive nature of the materials to be fractionated.

While certain embodiments of the invention have been described for illustrative purposes, the invention obviously is not limited thereto.

We claim:

1. A side draw tray section for a fractional distillation column comprising, in operable combination, a vertical section of a fractional distillation column, a tray, a portion of the periphery of said tray fitting said section of column and the remainder being a chord joining the ends of said portion of periphery, the area of said tray being such that the tray occupies a major portion of the cross-sectional area of said section of column, a plate attached to the edge of said tray defined by said chord, said plate extending upward and extending downward from the respective surfaces of said tray, an unobstructed vapor chimney in said tray extending to a level above the top edge of said plate, a first opening in said plate above and adjacent the top surface of said tray, a second opening in the wall of said section of column adjacent and above said tray for withdrawal of a side product, a liquid level sensing means in operative communication with the space above said tray and below the top edge of said plate, and means to indicate the rate of liquid flow through said first opening in response to the level of liquid on said tray as sensed by said liquid level sensing means.

2. In the side draw tray section of claim 1 wherein said first opening is a perforation.

3. In the side draw tray section of claim 1 wherein said first opening is a V-shaped slot with the apex of the V pointing downward.

4. A fractional distillation column comprising, in operable combination, a tubular, upright column, a tray positioned across the cross section of said column at a level at which a side product is to be withdrawn, a portion of the periphery of said tray being an arc and supported fluid tight by the inner surface of said column, and the remainder being a chord joining the ends of said arc, a vertically disposed plate positioned along the edge of said tray defined by said chord, said plate extending upward and downward from said tray, the space between said plate and the adjacent section of wall of said column defining a downcomer, a first opening in said plate at a level above and near the top surface of said tray, vapor-liquid contact promoting apparatus positioned operatively at levels above and below said tray, a vapor chimney in said tray and extending to a level above the top edge of said plate, means for entry of feed material into said column, a vapor chimney in said tray extending to a level above the top edge of said plate, means for entry of feed material into said column, separate means for outlet of overhead vapor and bottom materials from said column, a second opening in the wall of said column adjacent the top surface of said tray for outlet of a side draw product, a conduit communicating with said second opening, a motor valve in said conduit, a liquid level sensing means in communication with the space immediately above the top surface of said tray, a liquid level indicating-controller communicating operatively with said liquid level sensing means, a reset flow controller in operative communication with said motor valve and with said indicating-controller, the liquid level indicator of said controller being calibrated to indicate liquid flow through said first opening as reflux in response to level of liquid on said tray as sensed by said liquid level sensing means, and whereby upon sensing a level of liquid on said tray said controller regulates said motor valve thereby controlling flow of liquid therethrough with the simultaneous regulation of flow of liquid through said first opening as reflux.

5. In the column of claim 4 wherein said first opening is a perforation.

6. In the column of claim 4 wherein said first opening is a V-shaped slot with the apex of the V pointing downward.

7. A side draw tray section for a fractional distillation column comprising, in operable combination, a vertical section of a fractional distillation column, a tray, a major portion of the periphery of said tray fitting the inner wall of said section of column, the remainder of said periphery being so shaped as to be positioned at a spaced distance from the adjacent inner wall of said column thereby providing a free edge, a plate attached to said free edge, said plate extending upward and extending downward from said tray, an unobstructed vapor flow chimney in said tray extending to a level above the top edge of said plate, a first opening in said plate above the top surface of said tray, a second opening in the wall of said section of column adjacent and above said tray for withdrawal of a side product, a liquid level sensing means in operative communication with the space above said tray and below the top edge of said plate, and means to indicate the rate of liquid flow through said first opening in response to the level of liquid on said tray as sensed by said liquid level sensing means.

8. In the side draw tray section of claim 7 wherein said first opening is a perforation.

9. In the side draw tray section of claim 7 wherein said first opening is a V-shaped slot with the apex of the V pointing downward.

10. A fractional distillation column comprising, in operable combination, an upright column, a tray positioned across the column at a level at which a side product is to be withdrawn, a major portion of the periphery of said tray fitting the inner wall of said column, the remainder of the periphery being a spaced distance from the inner wall of said column thereby providing a free edge, a plate attached at one side surface to said free edge, said plate extending upward to a level above and to a level below said tray, the space between said plate and the adjacent wall of said column defining a downcomer, a first opening in said plate above and near the top surface of said tray, vapor-liquid contacting apparatus positioned operatively at levels above and below said tray, a vapor chimney in said tray extending to a level above the top edge of said plate, means for introducing feed stock into said column, separate means for outlet of overhead vapor and bottoms material from said column, a second opening in the wall of said column above and adjacent the top surface of said tray for outlet of a side draw product, a conduit exterior of said column communicating with said second opening, a motor valve in said conduit, a liquid level sensing means in communication with the normally liquid containing space on said tray, a recorder-controller communicating operatively with said liquid level sensing means and with said motor valve, the recorder of recorder-controller being calibrated to record liquid flow through said first opening as reflux in response to level of liquid on said tray as sensed by said sensing means, and whereby upon sensing a predetermined low level of liquid on said tray said controller closes said valve thereby permitting liquid remaining on said tray to flow through said first opening as reflux as long as liquid reaches said tray from said contacting apparatus thereabove.

11. In the column of claim 10 wherein said first opening is a perforation.

12. In the column of claim 10 wherein the first opening is a V-shaped slot with the apex of the V pointing downward.

References Cited in the file of this patent
UNITED STATES PATENTS

| | | |
|---|---|---|
| 2,006,986 | de Florez | July 2, 1935 |
| 2,467,951 | Whitley | Apr. 19, 1942 |

OTHER REFERENCES

"Instruments and Process Control," "Information Sheet 4," pages 11 to 17 and "Information Sheet 12," pages 155 to 185, published by New York State Vocational and Practical Arts Assn.; 1945.